US008413129B1

(12) United States Patent
Shinde et al.

(10) Patent No.: US 8,413,129 B1
(45) Date of Patent: Apr. 2, 2013

(54) APPLICATION REPAIR SYSTEM, METHOD, AND COMPUTER PROGRAM PRODUCT FOR GENERATING AN ALERT BASED ON INFORMATION DESCRIBING AT LEAST ONE UPDATE

(75) Inventors: Rajesh Shinde, Hyderabad (IN); Srikanth Chowdary Marri, Bangalore (IN)

(73) Assignee: McAfee, Inc., Santa Clara, CA (US)

( * ) Notice: Subject to any disclaimer, the term of this patent is extended or adjusted under 35 U.S.C. 154(b) by 1234 days.

(21) Appl. No.: 11/840,717

(22) Filed: Aug. 17, 2007

(51) Int. Cl.
*G06F 9/44* (2006.01)
(52) U.S. Cl. .......................................................... 717/168
(58) Field of Classification Search ........... 717/168–170
See application file for complete search history.

(56) References Cited

U.S. PATENT DOCUMENTS

| | | | | |
|---|---|---|---|---|
| 5,835,911 A * | 11/1998 | Nakagawa et al. | ................... | 1/1 |
| 2003/0065738 A1* | 4/2003 | Yang et al. | ..................... | 709/215 |
| 2004/0015942 A1* | 1/2004 | Branson et al. | ................ | 717/168 |
| 2007/0143851 A1* | 6/2007 | Nicodemus et al. | ............ | 726/25 |
| 2007/0150524 A1* | 6/2007 | Eker et al. | ..................... | 707/203 |
| 2008/0208610 A1* | 8/2008 | Thomas et al. | ................... | 705/1 |
| 2008/0319994 A1* | 12/2008 | Binding et al. | ................... | 707/6 |

* cited by examiner

*Primary Examiner* — Anna Deng
(74) *Attorney, Agent, or Firm* — Wong, Cabello, Lutsch, Rutherford & Brucculeri, L.L.P.

(57) ABSTRACT

A system, method, and computer program product are provided for generating an alert based on information describing at least one update associated with an application to be repaired. In operation, a request to repair an application is received. Additionally, information describing at least one update associated with the application is identified. Furthermore, an alert is generated based on the information.

16 Claims, 6 Drawing Sheets

APPLICATION REPAIR SYSTEM, METHOD, AND COMPUTER PROGRAM PRODUCT FOR GENERATING AN ALERT BASED ON INFORMATION DESCRIBING AT LEAST ONE UPDATE

FIELD OF THE INVENTION

The present invention relates to software applications, and more particularly to preventative maintenance events in handling and reporting unexpected errors and problems associated with repairing software applications.

BACKGROUND

Most available software packages have a built-in application repair process as part of a software support and maintenance feature. When a user initiates the application repair process, a repair module checks core files of the application and, in turn, services or replaces any corrupt files using backup files. As a result, the application may be repaired to an initial state in which the application may adequately function.

By using such built-in system repair/restore feature in applications, it is possible to go back to a point in time when the application operated correctly. However, such feature ensures that the application operates properly by simply reverting to a former state (e.g. an initial state, etc.). It is thus not designed or equipped to check for any potentially harmful effects and/or changes that the repair process may have made to such application or other applications installed on a system.

For example, by reverting to a previous state using the built-in application repair utility, recent updates may be lost without any user notification or consultation. Thus, previous updates to the repaired application, as well as previous updates to other applications, may be lost or discarded without the knowledge of the user. The loss of files corresponding to any hot fixes, updates, service packs, etc., which have previously been installed by the user, may in turn present the user with unknown system vulnerabilities, as well as other efficiency/optimization issues.

There is thus a need for addressing these and/or other issues associated with the prior art.

SUMMARY

A system, method, and computer program product are provided for generating an alert based on information describing at least one update associated with an application to be repaired. In operation, a request to repair an application is received. Additionally, information describing at least one update associated with the application is identified. Furthermore, an alert is generated based on the information.

DETAILED DESCRIPTION

Figure 1:
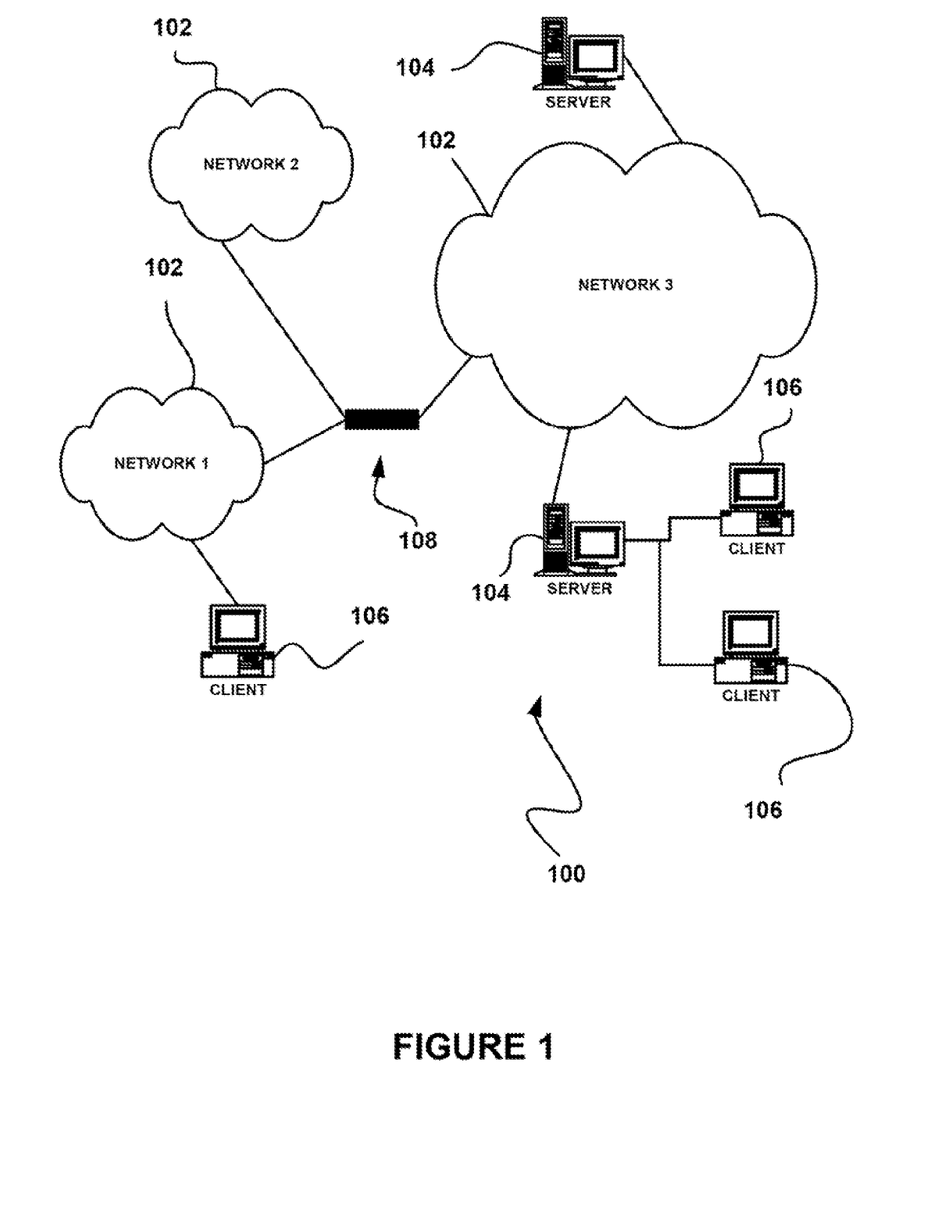
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
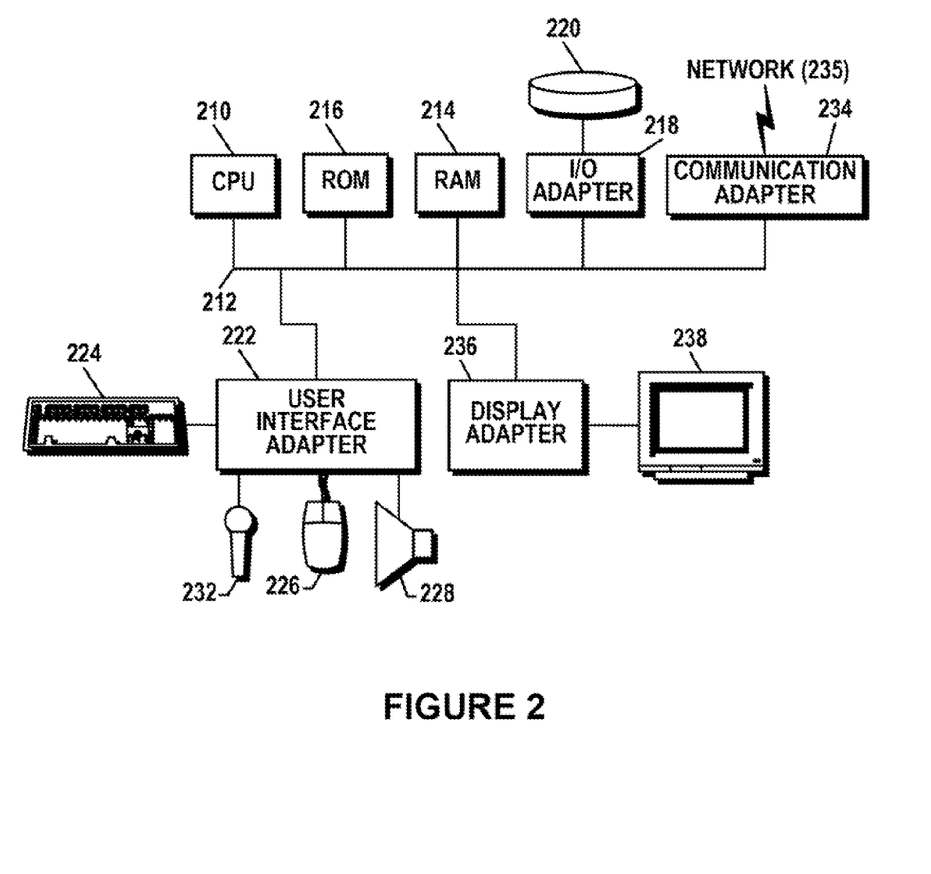
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
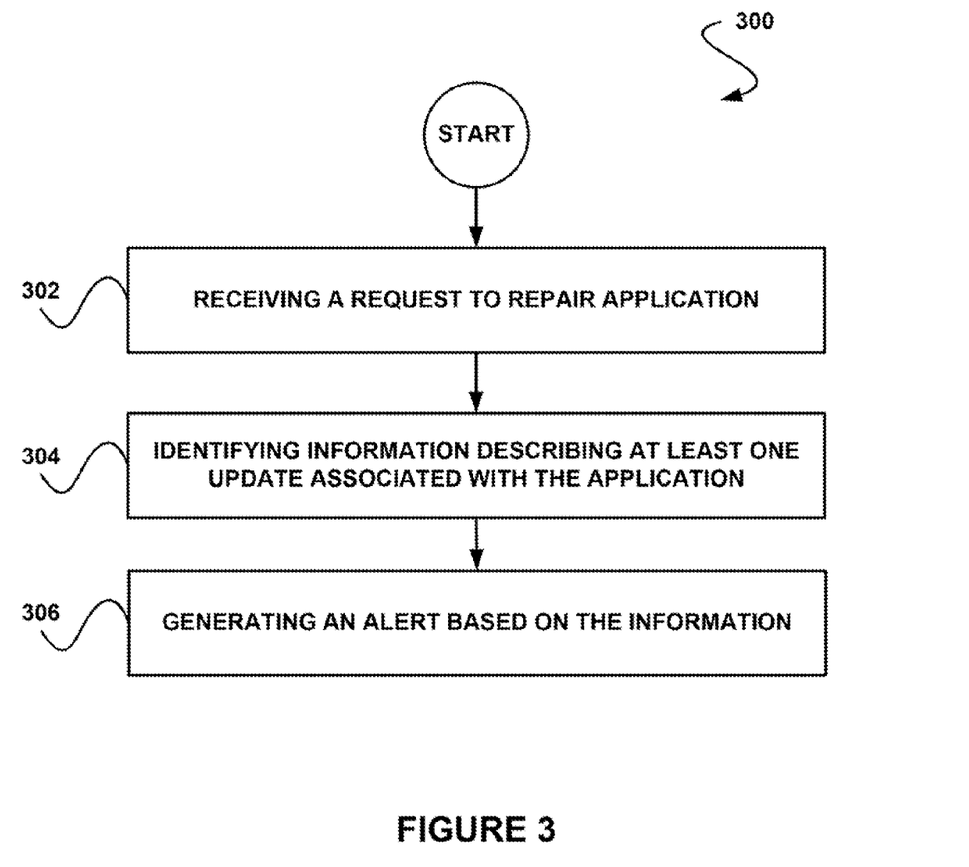
FIG. 3 shows a method for generating an alert based on information describing at least one update associated with an application to be repaired, in accordance with one embodiment.

FIG. 3 shows a method 300 for generating an alert based on information describing at least one update associated with an application to be repaired, in accordance with one embodiment. As an option, the method 300 may be implemented in the context of the architecture and environment of FIGS. 1 and/or 2. Of course, however, the method 300 may be carried out in any desired environment.

As shown in operation 302, a request to repair an application is received. In various embodiments, such request may be received over a network, or from a local system. In one embodiment, the request may be received from an application repair utility which is launched by a user. In such case, the repair utility may be launched by selecting the application from a list of Add/Remove programs in a control panel or by a utility of an application repair function of the application. In another embodiment, the request may be received by selecting any icon, or an application repair button accessible to the user. In various other embodiments, a command line user interface tool (CUI) may be used to receive the request to perform the repair. For example, the command line interface may have a plurality of options in addition to giving flexibility to a user via different switches which may optionally be used to request the repair of the application.

In the context of the present description, an application refers to any computer software that employs the capabilities of a device to a task. For example, in various embodiments, applications may include, but are not limited, security software (e.g. antivirus software, etc.), enterprise software, enterprise infrastructure software, information worker software, media and entertainment software, engineering software, and/or any other software that meets the above definition.

Further, in operation 304, information describing at least one update associated with the application is identified. In the context of the present description, an update refers to any additional information and/or code relating to, or affiliated with, an application. For example, in various embodiments, updates may include, but are not limited to patches, original equipment manufacturer (OEM) updates, hot fixes, changes to the application, service packs, data file updates (e.g. virus signature file updates), and/or any other information/code associated with the application that meets the above definition.

Further, the information associated with the update may include any information that is relevant to any aspect of the update. For example, in various embodiments, the information may include, but is not limited to any change or delta to the application that resulted from the update, update level and status information (e.g. update version information), update source, and/or any other information that meets the above definition. Strictly as an option, the information associated with the update may be stored. In various embodiments, the alert may be stored to in a text file, a database, or utilizing various other media.

As shown in operation 306, an alert is generated based on the information. In various embodiments, such alert may include, but is not limited to a message about the application and/or update status, message about the application and/or update level, indicator that the application is loosing information from a previous update (e.g. a prior virus signature list, etc.), message about updates that may be lost after a repair, message about updates that may need to be installed after a repair, and/or any other type of alert that is based on the information.

In one embodiment, the alert may be communicated to a user. In another embodiment, the alert may be displayed to the user. For example, the alert may include a popup message, text, audio, etc. As an option, an email alert may also be sent to an administrator. In various other embodiments, the alert may be stored in a text file, a database, or other media.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
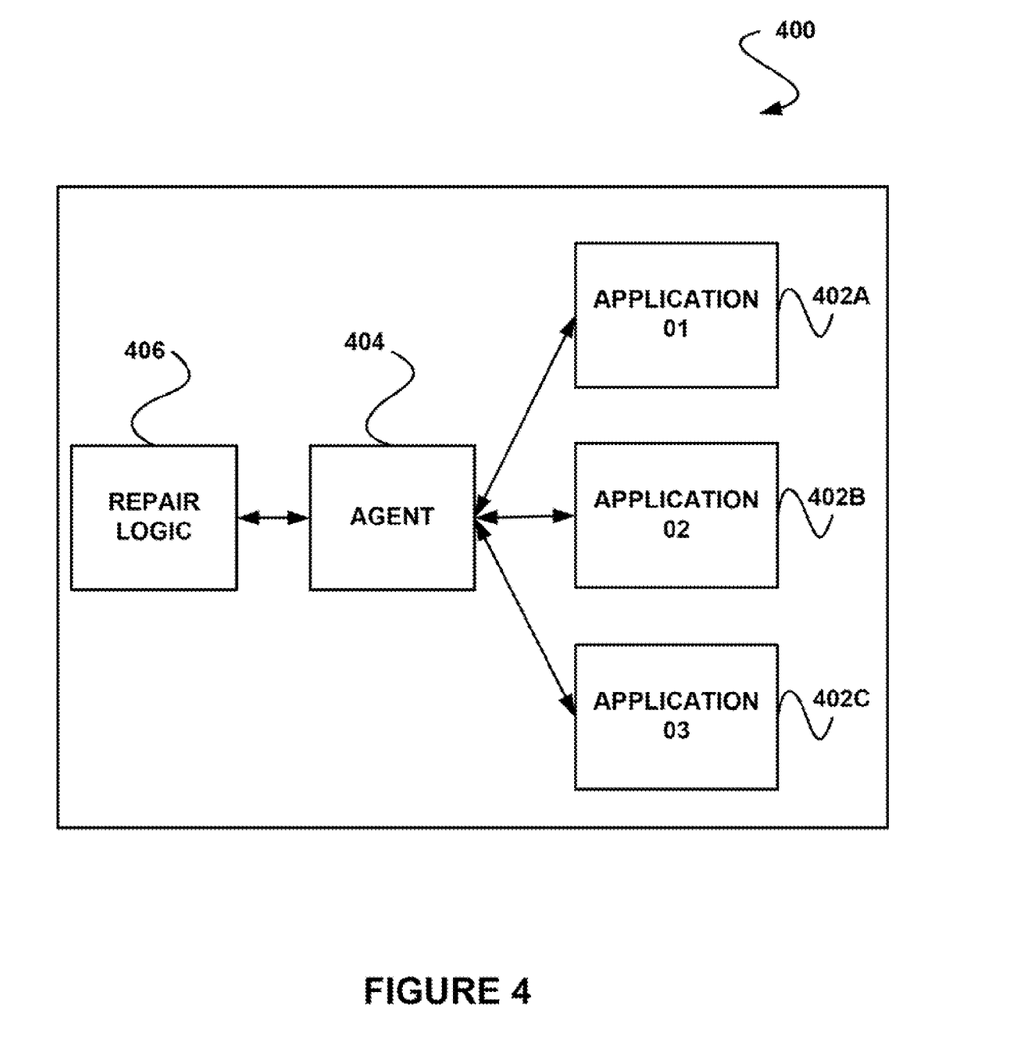
FIG. 4 shows a system for generating an alert based on information describing at least one update associated with an application to be repaired, in accordance with one embodiment.

FIG. 4 shows a system 400 for generating an alert based on information describing at least one update associated with an application to be repaired, in accordance with one embodiment. As an option, the system 400 may be implemented in the context of the architecture and environment of FIGS. 1-3. Of course, however, the system 400 may be implemented in any desired environment. It should also be noted that the aforementioned definitions may apply during the present description.

As shown, an agent 404 is provided which is in communication with at least one application 402A-C. As shown further, the agent 404 has access to repair logic 406 for repairing at least one of the applications 402A-C. In operation, a request to repair at least one of the applications 402A-C is received.

In one embodiment, such request may be received by the agent 404 from the applications 402A-C. In this case, the agent 404 may include an interface for receiving the request. In another embodiment, the request may be received by a separate module (not shown). In this case, the separate module may notify the agent 404 that the request to repair one of the applications 402A-C was received.

Once the request to repair one of the applications 402A-C has been received, information describing at least one update associated with the application may be identified. In one embodiment, the agent 404 may identify the information describing the update. Strictly as an option, the agent 404 may access a database (not shown) to identify such information. Additionally, the agent 404 may access the repair logic 406 to perform a repair on at least one of the applications 402A-C.

Furthermore, the agent 404 may generate an alert based on the information describing the update. Such alert may be communicated to a user in order to notify the user about application or update status, application or update level, updates that may be lost after a repair, updates that may need to be installed after a repair, files that may have been corrupted, files which may be or have been repaired or replaced, a time the repair is going to be implemented, and/or any other information that may be useful to the user.

In one embodiment, the system 400 may include a graphical user interface (GUI). In such case, the alert may be displayed using the GUI. In one embodiment, the GUI may allow the user to take action with respect to the alert prior to any application repair.

For example, the alert may include updates to be deleted as a result of the repair. In such case, the user may be presented with an option to preserve at least one of the updates to be deleted. Thus, upon a user indication, a selected update may be preserved. Without a user selection, the updates may be deleted by default.

Further, in one embodiment, the repair logic 406 may be stored in a database. In various embodiments, such database may be local to the agent 404, or remote to the agent 404. For example, in one embodiment, the agent 404, may access a database containing the repair logic 406 over a network. In another embodiment, the agent 404 may access the repair logic 406 using a system, such as the systems shown and described in the context of the details of FIGS. 1-2, for example.

Figure 5:
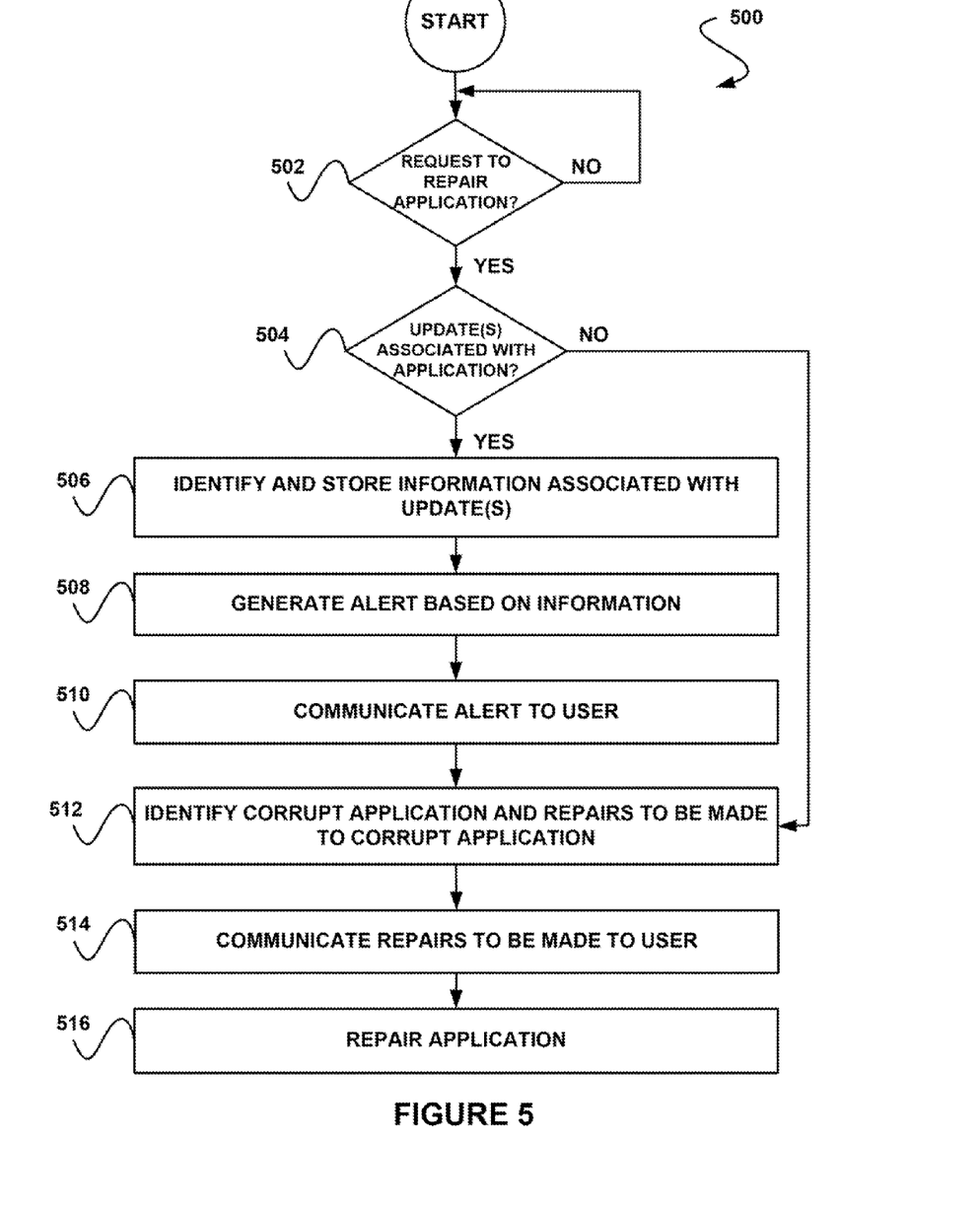
FIG. 5 shows a method for generating an alert based on information describing at least one update associated with an application to be repaired, in accordance with another embodiment.

FIG. 5 shows a method 500 for generating an alert based on information describing at least one update associated with an application to be repaired, in accordance with another embodiment. As an option, the method 500 may be implemented in the context of the architecture and environment of FIGS. 1-4. Of course, however, the method 500 may be carried out in any desired environment. It should also be noted that the aforementioned definitions may apply during the present description.

As shown in operation 502, it is determined whether a request to repair an application has been received. In one embodiment, the request may be received from a user utilizing an application repair interface (e.g. a repair wizard). As an option, the repair interface may be launched by selecting the product from a list of Add/Remove programs in a control panel or by a utility of an application repair function in the application.

In one embodiment, information about the application to be repaired may be captured upon receiving the request to repair the application. For example, information including a name, version, etc. of the application may be captured upon receiving the request.

If it is determined that a request to repair the application has been received, it is determined whether there are updates associated with the application, as shown in operation 504. In such case, a log or database of past updates that have been previously applied to the application may be queried, etc. Of course, such information may be stored locally or obtained by accessing a remote server (e.g. accessing a server over the Internet).

If it is determined that updates were previously installed with the application, information associated with such updates is identified and stored, as shown in operation 506. Further, in operation 508, an alert is generated based on the information. In various embodiments, such alert may include messages about an update status, messages about an update level, indicators that the application is reverting back to use of information prior to an update (e.g. use of a prior virus signature list), messages about updates that may be lost after a repair, messages about updates that may need to be installed after a repair, and/or any other type of information.

Once the alert has been generated, the alert is communicated to a user, as shown in operation 510. In various embodiments, the user may be an individual system user, an administrator, or any other user capable of receiving the alert. Furthermore, the alert may be communicated to the user in a variety of ways.

In various embodiments, the alert may be communicated to the user in the form of a window, GUI, pop-up, or any audio or visual notification. Furthermore, the alert may be communicated to the user on a user system. Such communication may be accomplished using a function of the application or a separate module.

As shown in operation 512, the corrupt application and corresponding repairs that are to be made to the application are identified. In one embodiment, such identification may be accomplished utilizing information in the request to repair the application. In another embodiment, the corrupted applications may be identified as the result of a scan for corrupt applications and/or files.

Once the repairs to be made to the corrupt application have been identified, the repairs to be made are communicated to the user, as shown in operation 514. In one embodiment, the repairs to be made that are communicated to the user may be included with the alert that is communicated to the user. For example, the alert communicated to the user may further include the repairs to be made to the corrupt application. In another embodiment, the alert that is communicated to the user and the repairs to be made that are communicated to the user may involve separate communications.

As an option, any application information (e.g. version information), alert information, update information (e.g. stage, level, and version information), and repair information may be stored. In various embodiments, such information may be stored in a database as a text document. Such storage may allow for the information to be reviewed or printed after the repair has completed, etc.

Further, in operation 516, the application is repaired. In one embodiment, the application may be repaired using repair logic which is stored in a database. In such case, the database may be a database local or remote to a system where the application is implemented and/or stored.

Figure 6:
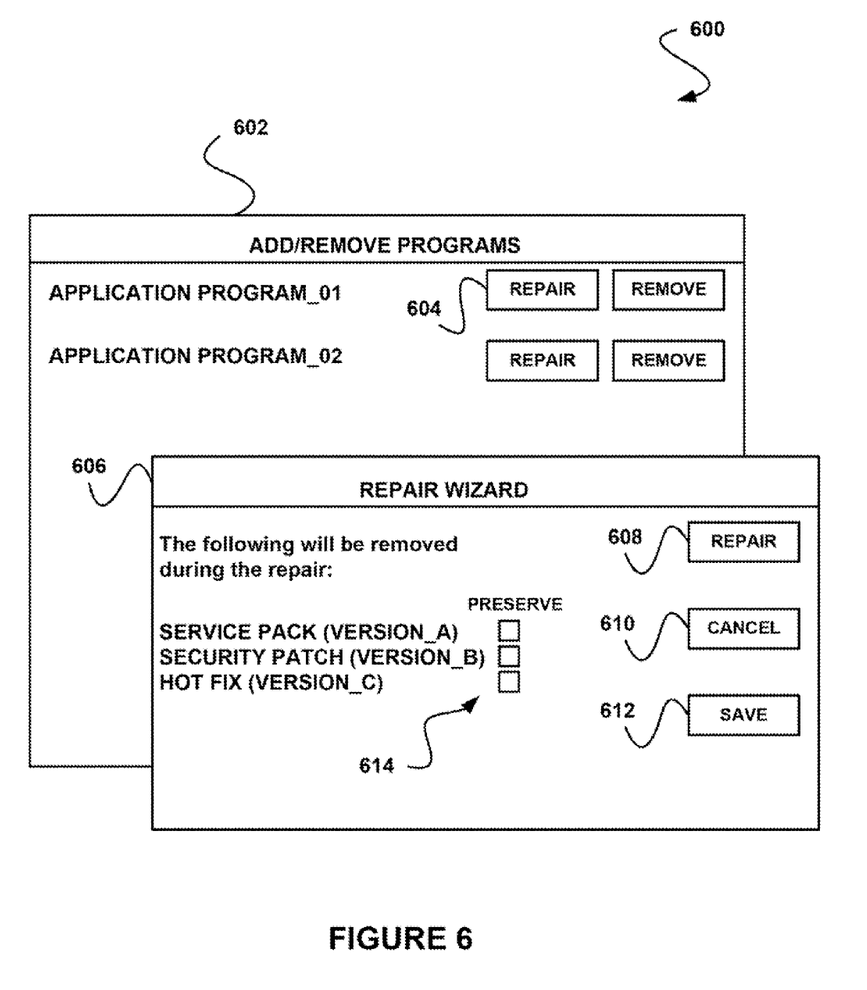
FIG. 6 shows a user interface for allowing a user to repair an application, in accordance with one embodiment.

FIG. 6 shows a user interface 600 for allowing a user to repair an application, in accordance with one embodiment. As an option, the user interface 600 may be implemented in the context of the architecture and environment of FIGS. 1-5. Of course, however, the user interface 600 may be implemented in any desired environment. It should also be noted that the aforementioned definitions may apply during the present description.

As shown, an add/remove program interface 602 is provided for allowing a user to access a plurality of applications in order to repair or remove such applications. Also included in the add/remove program interface 602, is a repair button 604 for allowing the user to repair a troubled or corrupt application.

In use, the user may elect to repair the troubled or corrupt application by selecting the repair button 604 on the add/remove program interface 602. Upon selection of the repair button 604, a repair wizard interface 606 may be presented to the user. Such repair wizard interface 606 may include a variety of information relating to the selected application.

Such information may include various update information. In one embodiment, and as shown in FIG. 6, the repair wizard interface 606 may include information about updates (e.g. service packs, hotfixes, etc.) relating to the application that will be deleted, lost, removed, etc. during the repair of the application. In one embodiment, such information about the application may be captured upon launching the repair wizard interface 606.

In one embodiment, the user may have the option to preserve the items to be deleted (e.g. removed or replaced) by indicating the desire to keep such items (e.g. files). For example, the user may have the option to select a preserve checkbox 614 corresponding to the item to be removed or replaced. In such case, the items selected to be preserved are not removed or replaced upon repair. It should be noted that the user may indicate the desire to preserve items in a variety of ways. The preserve checkboxes 614 are simply set forth as an example, in accordance with one embodiment, and should not be construed as limiting in any manner.

Further, as part of the repair wizard interface 606, various buttons may be provided corresponding to different options available to the user. For example, the user may have the option to initiate the repair of the application by selecting a repair button 608. Additionally, the user may have the option of cancelling the repair of the application by selecting a cancel button 610.

As yet another option, the user may save information included in the repair wizard interface 606 by selecting a save button 612 on the repair wizard interface 606. Upon selection of the save button 612, the user may conserve any modifications or configurations made to the repair wizard interface 606, such as the selection of items to preserve, as well as any additional information included in the repair wizard interface 606 (e.g. application version information, update status, etc.). Additionally, the user may use the save button 612 to save information to provide to a system administrator, for example.

Of course, the add/remove program interface 602 and the repair wizard interface 606 are shown for basic functional context only. In various embodiments, different user options may be provided as part of the add/remove program interface 602 and the repair wizard interface 606. Additionally, in various embodiments, the user functionality may be presented to the user using a variety of different layouts and/or graphics.

While the user interface 600 is explained in the context of an application repair, the user interface 600 is equally applicable to an operating system or application restore. In the case of an operating system restore, a user may launch a system restore wizard which allows the user to choose a date, or restore point, where the system was last known to be operating correctly. Thus, upon electing to restore the system, the user may be notified with alerts and/or with file preservation options relating to previous updates and/or application modifications.

As an example, a user may have installed an operating system on a user system on a specific date. On the same day, the user may have updated the operating system with recommended updates, hot patches, and service packs. One day later, the user may have installed antivirus software on the user system.

Two days after the antivirus software installation, the user may have updated the antivirus software to include the latest virus definitions for up-to-date virus protection. One week later, the user may have determined that a mistake was made while configuring the operating system or that the user system is not operating correctly following the installation of a new piece of hardware and/or a software application. The user may be unable to identify or remedy the problem.

Thus, the user may choose to use a system repair function. Such system repair function may be part of the operating system, for example. The user may elect to repair the system to a state corresponding to the last known date of total functionality (e.g. after the antivirus software installation).

In one embodiment, when the user launches the system repair function, current application and/or system information may be captured. In this example, such information may include information on all of the operating system updates installed by the user. Thus, the latest level and stage information of all of the updates may be captured upon launching the system restore function.

Additionally, information corresponding to the antivirus software installation and updates, such as the latest virus definitions, may be captured. All of this information may be used to generate alerts for the user. For example, an alert may be generated indicating that the restore will remove the latest virus definitions for the antivirus software.

In this example, the alert displayed is part of a user interface. In this case, the user interface may include a list of alerts such as a listing of all of the updates which will be removed upon the restoration. As part of the user interface, the user may be presented with an option to preserve any files which may be removed upon restoration. This function may allow the user to preserve the latest virus definitions for the antivirus software, for example.

Additionally, the user may receive alerts indicating actions that should be completed upon restoration. For example, if the user does not elect to preserve the latest virus definitions, the user may receive an alert indicating that such definitions should be updated immediately after the restore. Similarly, if the user has chosen a restoration point prior to any updates and/or patches implemented to the operating system, the user may receive an alert indicating that such updates and/or patches should be installed after the restore.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
receiving a request to repair a corrupt application;
identifying, by a processor, information describing at least one previously installed update associated with the corrupt application;
identifying, by the processor, at least one repair to be made to the corrupt application, wherein the at least one repair comprises returning the corrupt application to a previously working state;
presenting an alert based on the information, wherein the alert includes information on an update of the at least one previously installed update associated with the corrupt application to be deleted as a result of the at least one repair;
presenting information about the at least one repair to be made to the corrupt application;
presenting an option to preserve the update to be deleted; and
performing, by the processor, the repair to the corrupt application and deleting the preserved update in conformance with the option.

2. The method of claim 1, wherein the update includes at least one of a patch, an original equipment manufacturer update, a hot fix, a service pack, and a data file update.

3. The method of claim 1, wherein the information includes information about at least one virus signature update.

4. The method of claim 1, wherein the information includes update version information.

5. The method of claim 1, wherein the information includes application version information.

6. The method of claim 1, wherein the information is stored.

7. The method of claim 1, wherein the information is stored in a text file.

8. The method of claim 1, wherein the alert includes information about at least one corrupted file.

9. The method of claim 1, wherein the alert is presented with the information about the at least one repair.

10. A non-transitory computer readable medium comprising instructions stored thereon to cause one or more processors to:
receive a request to repair a corrupt application;
identify information describing at least one previously installed update associated with the corrupt application;
identify at least one repair to be made to the corrupt application, wherein the at least one repair comprises returning the corrupt application to a previously working state;
present an alert based on the information, wherein the alert includes information on an update of the at least one previously installed update associated with the corrupt application to be deleted as a result of the at least one repair;
present information about the at least one repair to be made to the corrupt application;
present an option to preserve the update to be deleted; and
perform the repair to the corrupt application and deleting the preserved update in conformance with the option.

11. The non-transitory computer readable medium of claim 10, wherein the update includes at least one of a patch, an original equipment manufacturer update, a hot fix, a service pack, and a data file update.

12. The non-transitory computer readable medium of claim 10, wherein the information includes information about at least one virus signature update.

13. The non-transitory computer readable medium of claim 10, wherein the information includes update version information.

14. The non-transitory computer readable medium of claim 10, wherein the information includes application version information.

15. The non-transitory computer readable medium of claim 10, wherein the alert includes information about at least one corrupted file.

16. The non-transitory computer readable medium of claim 10, wherein the alert is presented with the information about the at least one repair.

* * * * *